April 8, 1930. H. W. THAYER 1,753,672
SOUND AMPLIFYING DEVICE
Filed Oct. 10, 1928  2 Sheets-Sheet 1

INVENTOR.
Henry W. Thayer,
BY
George D. Richards
ATTORNEYS.

April 8, 1930. H. W. THAYER 1,753,672
SOUND AMPLIFYING DEVICE
Filed Oct. 10, 1928  2 Sheets-Sheet 2

INVENTOR.
Henry W. Thayer,
BY
George D. Richards
ATTORNEYS.

Patented Apr. 8, 1930

1,753,672

UNITED STATES PATENT OFFICE

HENRY W. THAYER, OF CHATHAM, NEW JERSEY

SOUND-AMPLIFYING DEVICE

Application filed October 10, 1928. Serial No. 311,450.

This invention relates, generally, to improvements in sound amplifying devices of the type shown and described in my United States Letters Patent No. 1,701,515, dated February 12, 1929; and this invention has for its principal object to provide an improved construction of coupled vibratory diaphragms spaced apart to furnish an intermediate resonance chamber having sound wave outlets.

This invention has for a further object to provide a novel main diaphragm structure having in combination therewith substantially radial distributing ribs adapted to uniformly disperse the vibratory impulses transmitted thereto substantially throughout the entire area of the diaphragm member, and especially toward the outer limits or circumference thereof, whereby a more uniform excitation of the body of air in contact with the diaphragm surface within the resonance chamber of the device is obtained, to the end that a more efficient regeneration of sound waves is attained with a resultant better and more faithful tonal quality of the reproduced sound.

Other objects of this invention, not at this time more particularly enumerated, will be clearly understood from the following detailed description of the same.

The invention is illustrated in the accompanying drawings, in which:—

Fig. 1 is a front face view of one form of coupled vibratory diaphragms spaced apart to furnish an intermediate resonance chamber having sound wave outlets, and embodying the improvements according to this invention; Fig. 2 is a vertical cross sectional view of the same; Fig. 3 is an inside face view of the main diaphragm showing one form of the distributing rib structure with which the same is provided; and Fig. 4 is a fragmentary detail section, taken on line 4—4 in said Fig. 3.

Similar characters of reference are employed in the said drawings to indicate corresponding parts.

Figure 1:
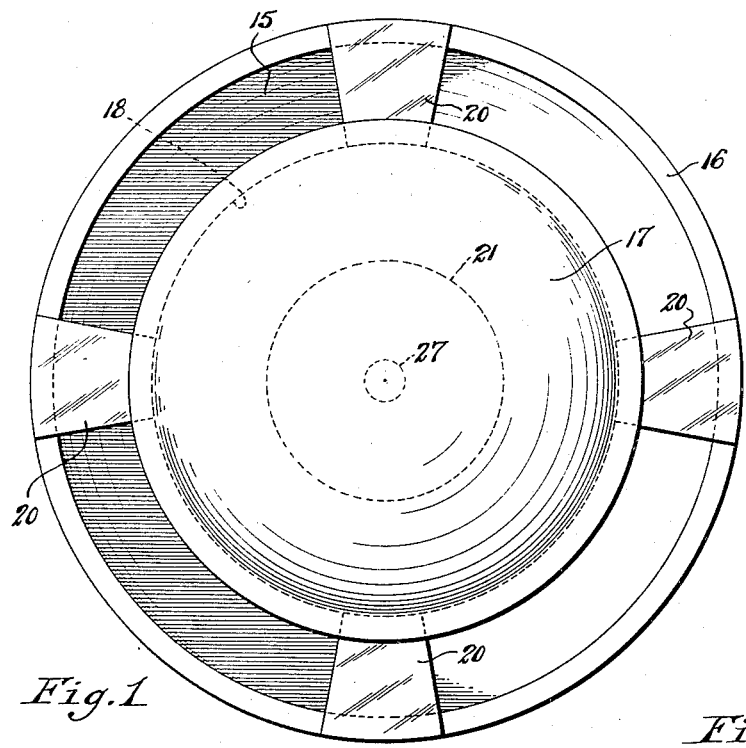
Figure 2:
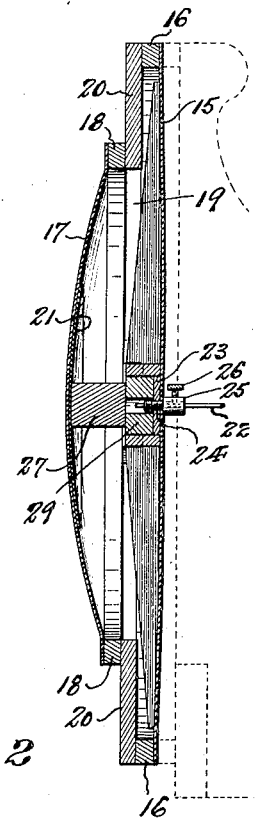
Figure 3:
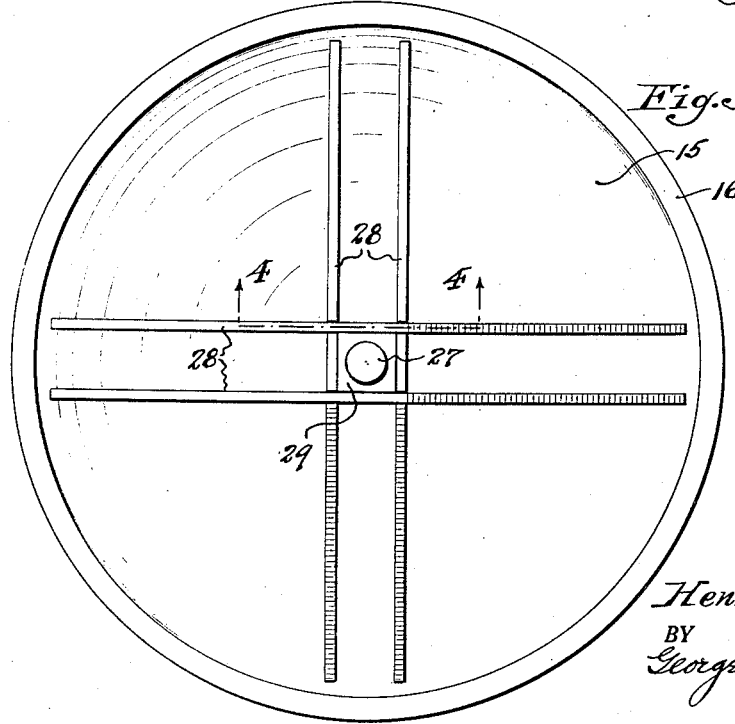
Figure 4:
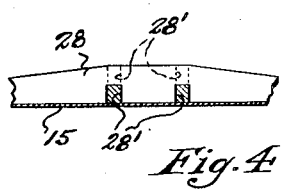

In the drawings the amplifying device is shown as comprising a main diaphragm 15 connected by its marginal portions to a forwardly facing supporting ring 16, a forward diaphragm 17 connected by its marginal portions to a rearwardly facing supporting ring 18; said diaphragms being axially aligned and spaced apart, to provide an intermediate resonance chamber 19, by means of radial spacer blocks 20 inserted between the supporting rings 16 and 18 and secured thereto, all so that open spaces are provided between said spacer blocks 20 adapted to lead outwardly from the interior of said resonance chamber, thus providing sound wave outlets for the latter. If desired, the rearward or main diaphragm 15 may be of rearwardly directed concavo-convex conformation, while the forward diaphragm may be of forwardly directed concavo-convex conformation.

Preferably said forward diaphragm 17 is centrally reenforced by a reenforcing disc 21 of reduced diameter, which is adhesively secured to the inner face thereof, although I do not intend to limit myself to such construction or arrangement.

Secured to the inner or forward face of said rear diaphragm 15 by any suitable means, but preferably by a strong adhesive such as glue, are a plurality of distributing ribs disposed to radiate from the central point of the diaphragm toward the periphery thereof but terminating short of the supporting ring 16 and within the effective limits of the vibratory body of said diaphragms. These ribs may be made of any suitable material, such as wood, fibre, pyroxylin, etc., and are preferably of tapering form, diminishing in size or thickness toward their outer extremities.

Means for coupling to the diaphragm 15 the transmission rod 22 of a telephonic receiving unit or other desired form of vibratory reproducer (not shown) is provided. Said means comprises a perforate internally threaded disc 23 centrally secured to the diaphragm 15 in connection with the distributing ribs thereof. Threaded into said disc is the externally threaded shank 24 of a rearwardly projecting coupling socket 25, in which the end of said transmission rod 22 may be inserted and thereupon secured by a set screw 26 so that the vibrations of the telephonic receiving unit or other vibratory device may be operatively transmitted to said diaphragm 15. The forward diaphragm 17 is coupled with the main diaphragm 15, so as to be positively and synchronously vibrated therewith, by means of a coupling or connector piece 27 which may be retained in place by the inherent opposing stresses of the diaphragms 15 and 17, or which, if desired, may be mechanically secured as by glue or other fastening means to the central portion of the main diaphragm rib structure and at the other end by glue or other fastening means to the inner side of said diaphragm 17. Said coupling or connector piece 27 may be made of any substantially rigid material. I have found cork to be especially suitable for the purpose since it is both rigid enough to transmit vibratory effects while nevertheless is slightly resilient so that any tendency to the production of metallic timbre in the mechanical vibration of the diaphragm is avoided.

There are a variety of specifically different forms and arrangements of distributing rib structure which may be satisfactorily employed in connection with the diaphragm 15. In the accompanying drawings I have shown several such forms and arrangements which are illustrative of the principles of construction involved in and which are all within the scope of this invention.

Referring to Figs. 1 to 4 inclusive, I have therein shown one arrangement of distributing ribs, comprising pairs of parallel spaced rib members 28 disposed at right angles. Each rib member is an integral structure extending from side to side of the diaphragm 15, and said rib members are provided with interfitting mortised portions 28' at their points of intersection. The said rib members 28 are glued or otherwise firmly secured to the inner face of the diaphragm 15, and their intersecting portions surround the disc 23 heretofore mentioned. A center block 29 is inserted within the space bounded by the intersecting portions of the rib members, said center block being firmly secured to the rib members by glue or other suitable fastening means. Said center block serves as a point of attachment for one end of the coupling or connector piece 27, whereby the forward diaphragm 17 is operatively coupled with the diaphragm 15 and its rib structure so as to vibrate synchronously therewith.

Figure 5:
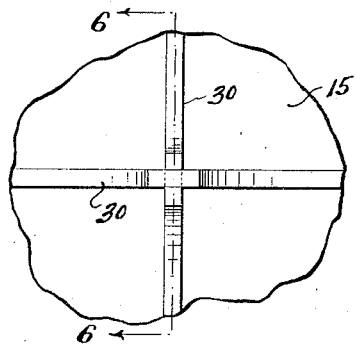
Fig. 5 is a fragmentary inside face view of the main diaphragm, showing a modified arrangement of distributing rib structure.
Figure 6:
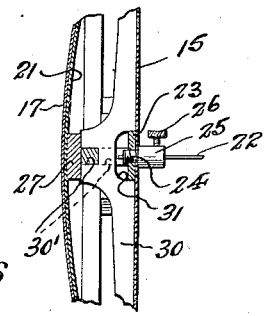
Fig. 6 is a sectional view of same, taken on line 6—6 in Fig. 5.

In Figs. 5 and 6 I have shown another simple form and arrangement of distributing rib structure, comprising single rib members 30 of integral form arranged at right angles one to the other and extending from side to side of and securely affixed to the diaphragm 15, the same having interfitting central mortised portions 30' at their points of intersection. These rib members 30 are cut away at their inner central portions, as indicated at 31, to straddle the disc 23. Preferably the intersecting central portions of these rib members 30 are outwardly projected as shown to provide a point of attachment for one end of the coupling or connector piece 27, whereby the forward diaphragm 17 is operatively coupled with the diaphragm 15 and its rib structure to vibrate synchronously therewith.

Figure 7:
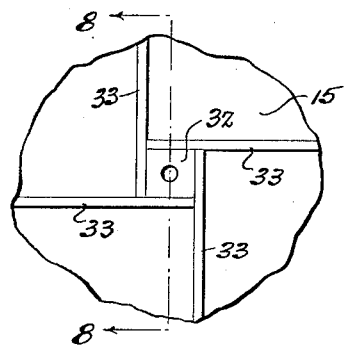
Fig. 7 is a fragmentary inside face view of the main diaphragm, showing another modified arrangement of distributing rib structure.
Figure 8:
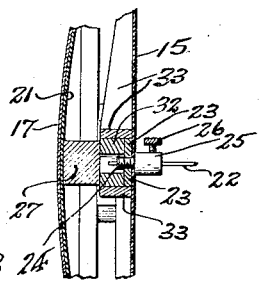
Fig. 8 is a sectional view of the same, taken on line 8—8 in Fig. 7.

In Figs. 7 and 8 I have shown another modified arrangement of distributing rib structure, which comprises the provision of a central rectangular block 32 superimposed on the disc 23, and to the respective sides of which are secured, by glue or other suitable fastening means, rib-arms 33 adapted to extend outwardly from said block 32 toward the marginal portions of the diaphragm 15, said rib-arms 33 being securely affixed to the inner face of the latter. The coupling or connector piece 27 is mounted between the forward diaphragm 17 and said central block 32.

Figure 9:
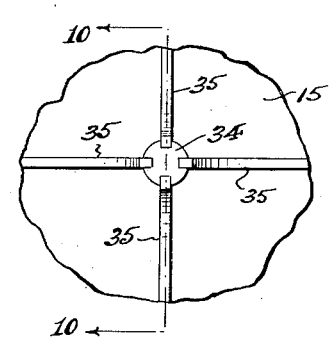
Fig. 9 is a fragmentary inside face of the main diaphragm, showing still another modified arrangement of distributing rib structure.
Figure 10:
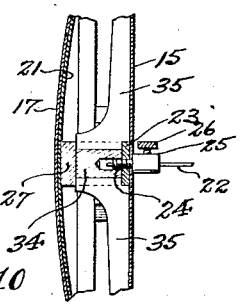
Fig. 10 is a sectional view of the same, taken on line 10—10 in Fig. 9.

In Figs. 9 and 10 I have shown a still further modified arrangement of distributing rib structure, the same consisting in a hub block 34 superimposed on the disc 23, and mortised into said hub block 34 are the radiating rib members 35, which extend therefrom toward the marginal portions of the diaphragm 15, and which are also securely affixed to the inner face of said diaphragm. The coupling or connector piece 27 is mounted between the forward diaphragm 17 and said hub block 34.

Figure 11:
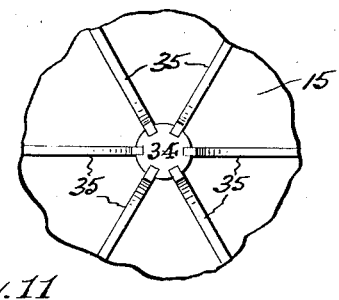
Figs. 11 and 12 are respectively additional fragmentary inside face views of the main diaphragm with further modified arrangements of distributing rib structure.
Figure 12:
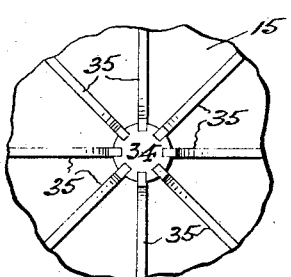

In Fig. 9 I have shown four radial rib members 35 spaced ninety degrees apart; it will be obvious, however, that more or less than four rib members may be utilized. For example, in Fig. 11 I have shown six such radial rib members, and in Fig. 12 eight such radial rib members, equi-spaced around the inner face of the diaphragm 15.

In the operation of the amplifying device, the telephonic receiver or other vibratory transmission unit transmits, through the rod 22, the vibrations to the central part of the diaphragm 15; the distributing rib structure with which the diaphragm 15 is provided tends to radially disperse the vibratory impulses uniformly throughout the entire area of the diaphragm 15, with the result that the body of air within the resonance chamber is more efficiently excited and the tonal quality of the sound reproduced is greatly improved.

In general the operation of the coupled diaphragms providing the resonance chamber is the same in principle and effect as that described in my copending application Ser. No. 233,793, filed November 17, 1927, and already above referred to, in the instant species the forward diaphragm 17 being interconnected through the coupling or connector piece 27 so as to partake of the vibrations transmitted to the rear diaphragm 15, whereby the two diaphragms vibrate in synchronism with exciting effect on the air within the resonance chamber 19 and resultant dispersion of sound waves through the marginal outlets with which said resonance chamber is provided.

As many changes, other than those already indicated, could be made in the above described construction, and many apparently widely different embodiments of this invention could be made without departing from the scope thereof, it is intended that all matter contained in the above description or shown in the accompanying drawings shall be interpreted as illustrative and not in a limiting sense.

I claim:—

1. In a sound amplifying device comprising a plurality of spaced diaphragms centrally coupled for synchronous vibration and so as to provide resonance space therebetween having sound wave outlets adjacent to the margins of the diaphragms, a plurality of uniformly spaced distributing ribs affixed to the inner face of one of said diaphragms to radiate from its central portion toward but short of the margins thereof so as to vibrate therewith, said ribs being of tapering formation toward their outer extremities, and means connected with said latter diaphragm for transmitting to said diaphragms vibratory motion of the order of sound wave frequencies.

2. In a sound amplifying device, a pair of diaphragms in axial alignment and spaced apart to provide a resonance chamber, peripheral rings to support the marginal portions of said diaphragms, spacing means intermediate and to which said rings are secured and disposed to provide therebetween sound wave outlets leading from said resonance space, a plurality of distributing ribs affixed to the inner face of one diaphragm to radiate from its central portion toward but short of the margins thereof so as to vibrate therewith, means to couple said diaphragms for synchronous vibration, and means connected with said rib-provided diaphragm for transmitting to both said diaphragms vibratory motion of the order of sound wave frequencies.

3. In a sound amplifying device, a pair of diaphragms in axial alignment to provide an intermediate resonance space, a peripheral supporting frame structure intermediate and to which the margins of said diaphragms are secured, said frame structure being provided with sound wave outlets leading from said resonance space, the forward diaphragm being of forwardly projected concavo-convex form, means to reenforce the central portion of said forward diaphragm, and means to centrally couple said diaphragms for synchronous vibration.

4. In a sound amplifying device, a pair of diaphragms in axial alignment to provide an intermediate resonance space, a peripheral supporting frame structure intermediate and to which the margins of said diaphragms are secured, said frame structure being provided with sound wave outlets leading from said resonance space, the forward diaphragm being of forwardly projected concavo-convex form, means to reenforce the central portion of said forward diaphragm, the rearward diaphragm being of rearwardly projected concavo-convex form, a plurality of distributing ribs affixed to the inner face of said rearward diaphragm to radiate from its central portion and so as to vibrate therewith, and means to centrally couple said diaphragms for synchronous vibration.

5. A sound amplifying device as defined in claim 4, in which said distributing ribs are provided with a tapering formation toward their outer extremities.

In testimony, that I claim the invention set forth above I have hereunto set my hand this 6th day of October, 1928.

HENRY W. THAYER.